US010272850B2

(12) United States Patent
Frank et al.

(10) Patent No.: US 10,272,850 B2
(45) Date of Patent: Apr. 30, 2019

(54) ROOF MOUNTING FOR AUTONOMOUS VEHICLE SENSOR ASSEMBLY

(71) Applicant: Ford Global Technologies, LLC, Dearborn, MI (US)

(72) Inventors: Steven Frank, Dearborn, MI (US); Phu Diep, Westland, MI (US); Steven William Gallagher, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 242 days.

(21) Appl. No.: 15/338,762

(22) Filed: Oct. 31, 2016

(65) Prior Publication Data

US 2018/0015886 A1 Jan. 18, 2018

Related U.S. Application Data

(60) Provisional application No. 62/362,722, filed on Jul. 15, 2016.

(51) Int. Cl.
*B60R 11/00* (2006.01)
*B60R 11/04* (2006.01)
*B60R 13/06* (2006.01)
*G01D 11/30* (2006.01)
*B62D 25/06* (2006.01)

(52) U.S. Cl.
CPC ............. *B60R 11/04* (2013.01); *B60R 13/06* (2013.01); *B62D 25/06* (2013.01); *G01D 11/30* (2013.01); *B60R 2011/004* (2013.01); *B60R 2011/005* (2013.01)

(58) Field of Classification Search
CPC ... B60R 11/04; B60R 13/06; B60R 2011/004; B60R 2011/005; G01D 11/30; G01D 11/305
USPC ................. 73/865.5, 178 R, 170.02, 170.03, 73/170.16–170.28, 493; 348/118–120;
(Continued)

(56) References Cited

U.S. PATENT DOCUMENTS 5,681,076 A 10/1997 Yoshii
7,227,508 B2 6/2007 Wang et al.
(Continued)

FOREIGN PATENT DOCUMENTS

CN 202782968 U 3/2013
CN 106945612 A 7/2017
(Continued)

OTHER PUBLICATIONS

UKIPO Search Report for Application No. GB1711168.3 dated Dec. 5, 2017 (3 pages).
(Continued)

*Primary Examiner* — Robert R Raevis
(74) *Attorney, Agent, or Firm* — Frank A. MacKenzie; Bejin Bieneman PLC

(57) ABSTRACT

A mount for a roof-mounted autonomous vehicle sensor assembly includes a cap, a seal, and a plurality of support members. The mount is compatible in shape with a moonroof opening in a vehicle roof panel. The cap is sized to overlap the moonroof opening. The cap has a plurality of attachment features to connect to the sensor assembly. The seal is to be disposed between the cap and the roof panel. The plurality of support members connects the cap to roof rails.

17 Claims, 9 Drawing Sheets

(58) Field of Classification Search
USPC ........ 396/419, 427, 428, 544; 356/614–624; 324/160–180; 248/346.01–346.5
See application file for complete search history.

(56) References Cited

U.S. PATENT DOCUMENTS

| | | | |
|---|---|---|---|
| 7,504,965 B1 * | 3/2009 | Windover | G08G 1/0175 340/933 |
| 7,914,072 B2 | 3/2011 | Queener et al. | |
| 9,045,168 B2 | 6/2015 | Wagner et al. | |
| 2010/0231007 A1 | 9/2010 | Freeman et al. | |
| 2017/0305242 A1 | 10/2017 | Gallagher et al. | |

FOREIGN PATENT DOCUMENTS

| | | | |
|---|---|---|---|
| DE | 19716552 A1 | | 11/1998 |
| JP | 403102213 | * | 4/1991 |

OTHER PUBLICATIONS

Lowensohn, Josh, "For $10,000, your car can drive itself," The Verge, Jun. 23, 2014, 6 pages.

* cited by examiner

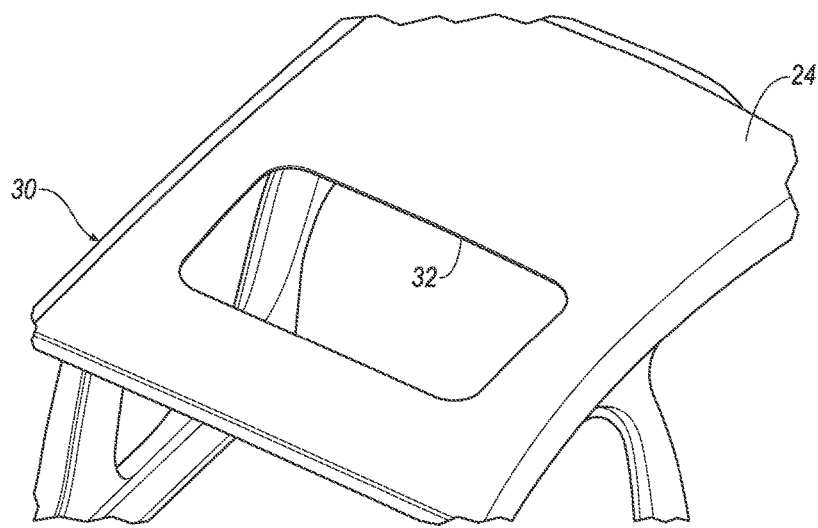
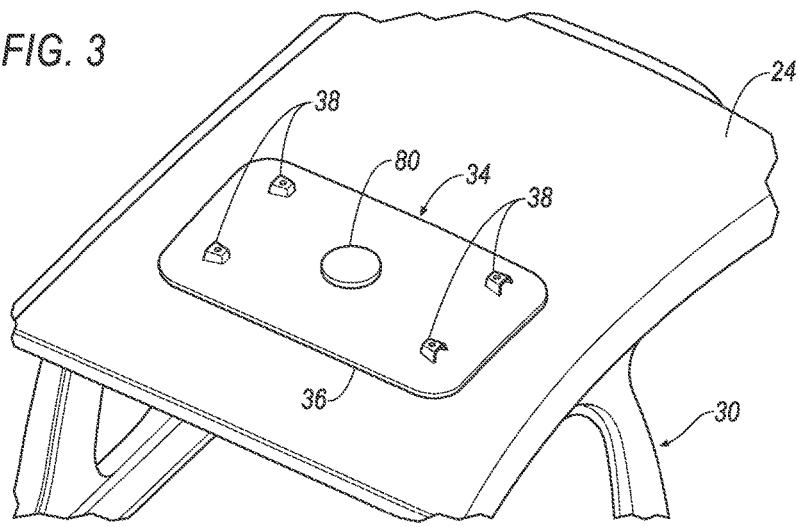

ROOF MOUNTING FOR AUTONOMOUS VEHICLE SENSOR ASSEMBLY

CROSS-REFERENCE TO RELATED APPLICATIONS

The subject patent application claims priority to and all the benefits of U.S. Provisional Patent Application No. 62/362,722 filed on Jul. 15, 2016, which is herein incorporated by reference in its entirety.

BACKGROUND

Autonomous vehicles have roof-mounted sensors needed to provide situational information to a vehicle controller.

BRIEF DESCRIPTION OF THE DRAWINGS

FIG. 2 is a perspective view of an exemplary vehicle body-in-white with a moonroof opening in a roof panel.

FIG. 3 is the body-in-white and the roof panel of FIG. 2 with a mounting cap disposed in the moonroof opening.

DETAILED DESCRIPTION

Introduction

An autonomous vehicle may have a sensor assembly mounted on a roof panel thereof. It is desired to use an existing vehicle platform as a platform for an autonomous vehicle. Mounting the sensor assembly to a vehicle roof panel requires both providing a attachment feature to receive the sensor assembly on or in the roof panel and providing additional structure to support the sensor assembly, as the sensor assembly may weigh between 45 and 70 kilograms. To avoid the need to provide a single-purpose roof panel for autonomous versions of a vehicle platform, it is desired to employ a roof panel that already has a suitable opening therein.

An example mount for a roof-mounted autonomous vehicle sensor assembly includes a cap, a seal, and a plurality of support members. The mount is compatible in shape with a moonroof opening in a vehicle roof panel. The cap is sized to overlap the moonroof opening. The cap has a plurality of attachment features to connect to the sensor assembly. The seal is to be disposed between the cap and the roof panel. The plurality of support members connects the cap to roof rails.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described.

The elements shown may take many different forms and include multiple and/or alternate components and facilities. The example components illustrated are not intended to be limiting. Indeed, additional or alternative components and/ or implementations may be used. Further, the elements shown are not necessarily drawn to scale unless explicitly stated as such.

Exemplary System Elements

Figure 1:
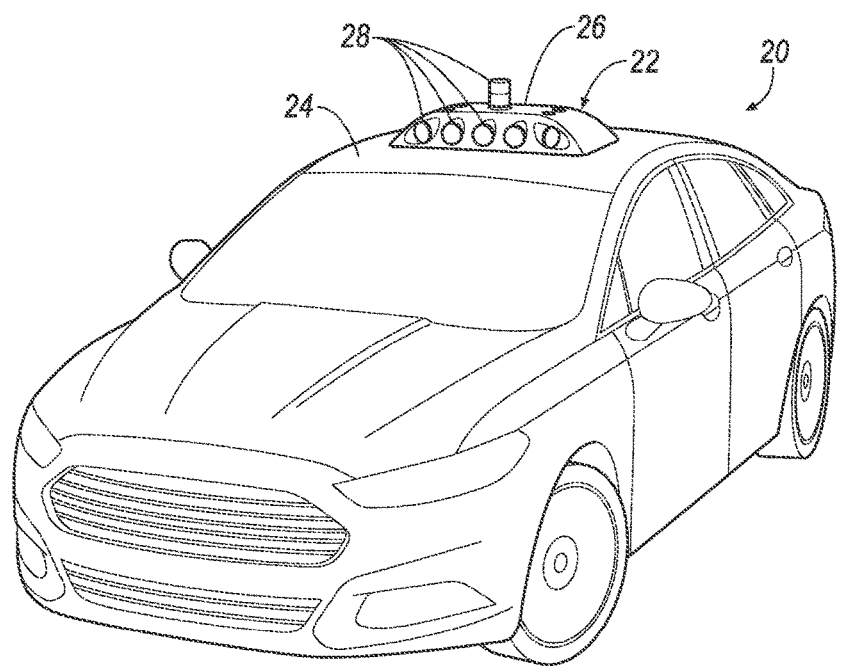
FIG. 1 is a perspective view of an exemplary sensor assembly mounted on an exemplary vehicle.

FIG. 1 illustrates an exemplary vehicle 20 with an exemplary sensor assembly 22 disposed on an exemplary roof panel 24. Sensor assembly 22 is most prominently defined by an exemplary housing 26 which protects sensitive electronic components of assembly 22. Certain sensors 28 are embedded in and project from housing 26. Sensors may include by way of example and not limitation, LIDAR (an acronym of "LIght Detection And Ranging" or alternatively "Light Imaging, Detection And Ranging") units, long range radar units, short range radar units, and cameras.

FIG. 2 illustrates a partial body-in-white structure 30 with the roof panel 24 in its assembled position. Roof panel 24 includes an exemplary opening 32 that, for the purpose of distinguishing opening 32 from other openings and apertures, is referred to herein as a moonroof opening. Moonroof opening 32 is so named as it is formed to accommodate the installation of a moonroof (not shown) or sunroof (not shown) in a vehicle. A distinction between a moonroof and a sunroof is primarily in that the moonroof is transparent and the sunroof is not transparent. The sunroof may be painted the same color as the rest of the vehicle body panels. Sunroofs and moonroofs are each commonly able to open to allow the communication of air into and out of a passenger cabin. The opening 32 is labeled a moonroof opening to indicate that the opening 32 is suited for use with a moonroof or a sunroof and does not restrict the use of the opening 32 from being used for other purposes.

FIG. 3 illustrates part of a sensor mount 34 disposed in opening 32. A mounting cap 36 of mount 34 is disposed in and overlaps opening 32. Mounting cap 36 may be formed of a substantially rigid polymer and may be a composite structure such as a carbon fiber reinforced plastic. A sealing plug 80 is removably disposed in a cable aperture 82, best seen in FIG. 5. Cable aperture 82 facilitates the passage of electrical power and signal cables (not shown) from sensor assembly 22 into the passenger cabin for routing to a controller (not shown). Four exemplary cap attachment features 38 are shown on an upper surface 37 of cap 36.

Figure 4:
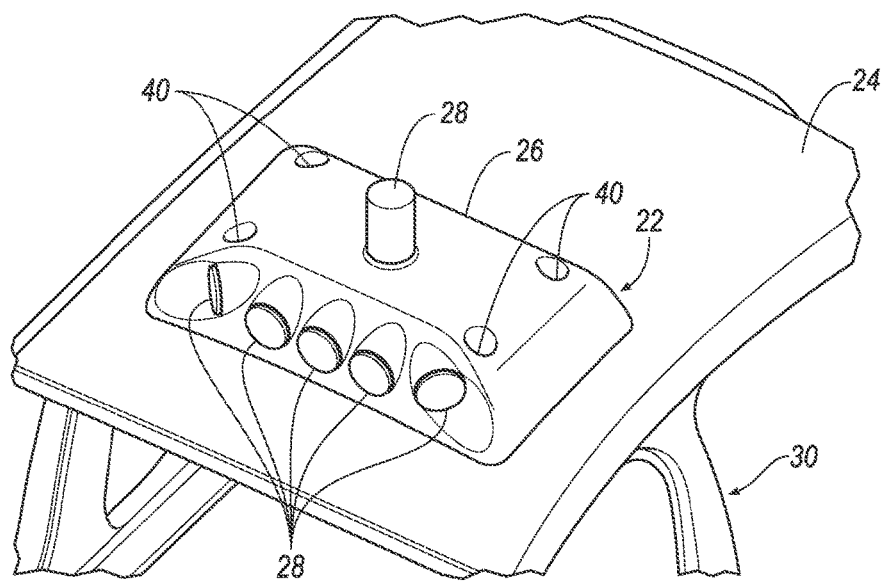
FIG. 4 is the body-in-white of FIG. 3 with the sensor assembly disposed over and concealing the mounting cap.

FIG. 4 illustrates sensor assembly 22 disposed over cap 36. Sensor assembly attachment features 40 formed in housing 26 are aligned with cap attachment features 38. An example attachment feature 40 may include a pocket with a lower end engaging cap 36 at attachment feature 38. An exemplary fastening arrangement may use complementary fasteners with each of features 38 and 40. An example attachment feature 38 may be a boss or a flange with a nut retained therein. A complementary bolt or screw may pass through an aperture at a bottom of the pocket of feature 40 to engage such a nut. Alternatively, a boss may be formed on a side of cap opposite sensor assembly 22 for the purpose of retaining such a nut. Yet alternatively, a threaded bolt may be molded into cap 36, with a threaded end extending away from cap 36. Such a bolt may extend up through the aperture in 40, and a nut threaded over the bolt.

Figure 5:
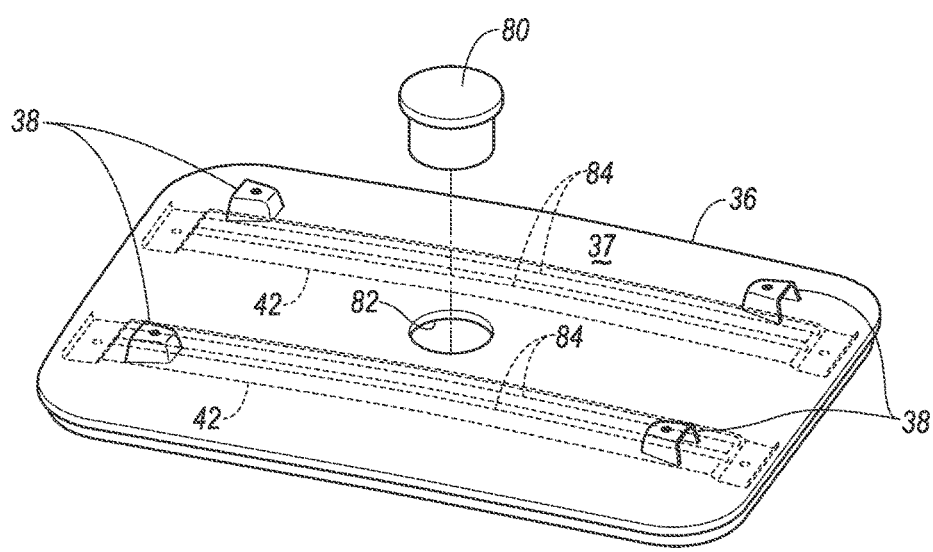
FIG. 5 is a perspective view of the mounting cap with exemplary support bows shown with hidden lines.

With sensor assembly 22 mounting to cap 36, it is apparent that cap 36 must be strongly mounted to roof panel 24 and to the body-in-white structure 30. FIG. 5 illustrates an exemplary pair of support bows 42 that may be used to support and reinforce cap 36. Bows 42 may include stiffening support beads 84. Sealing plug 80 is shown disposed above cable aperture 82. Attachment features 38 can be seen in more detail in FIG. 5.

Figure 6:
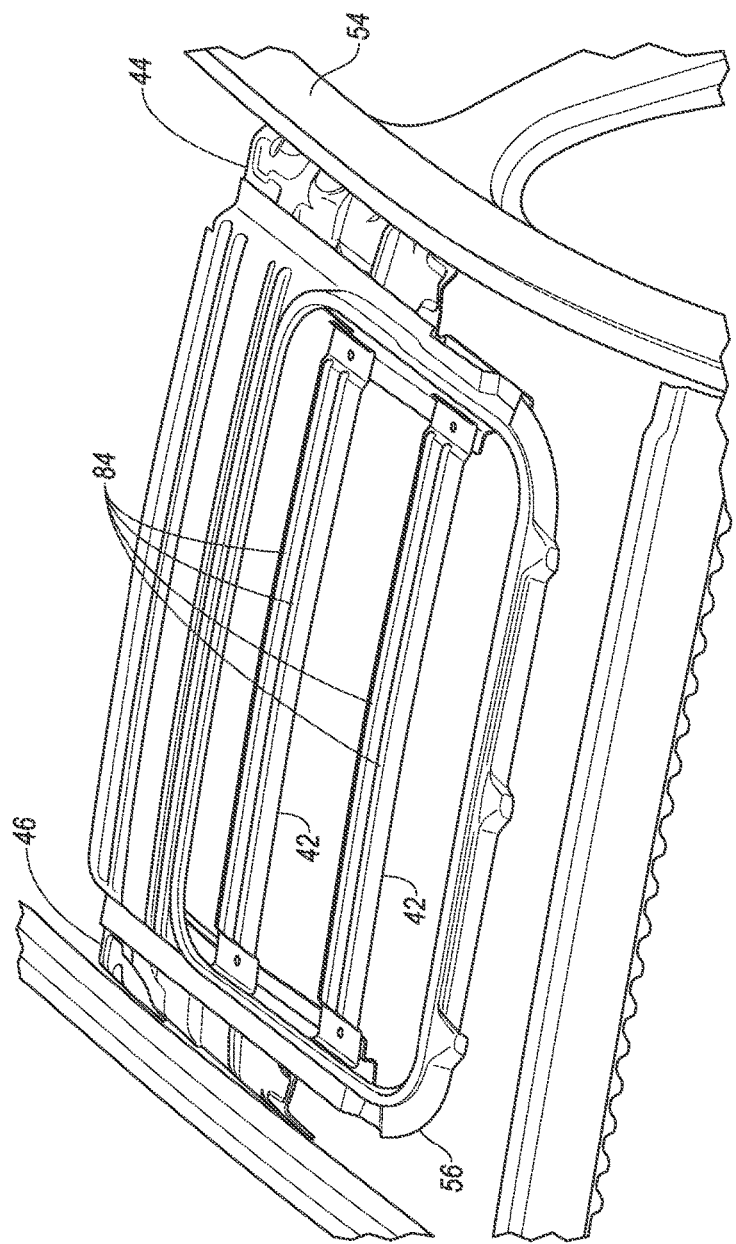
FIG. 6 is a perspective view of the body-in-white without a roof panel but with exemplary brackets supporting the exemplary bows and also supporting a reinforcement ring.
Figure 7:
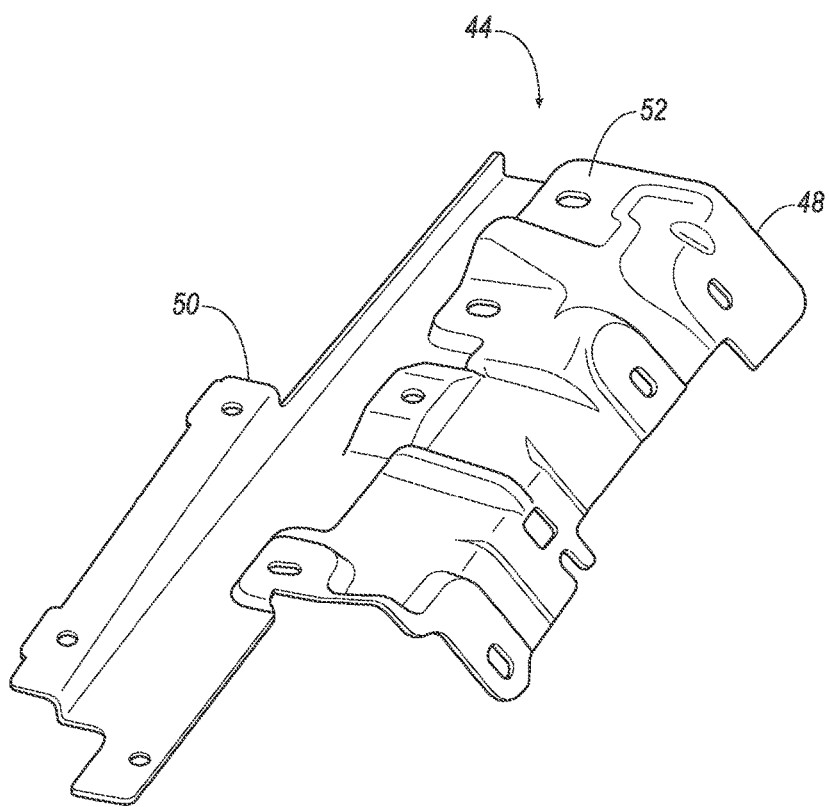
FIG. 7 is an enlarged perspective view of a left-hand bracket.
Figure 10:
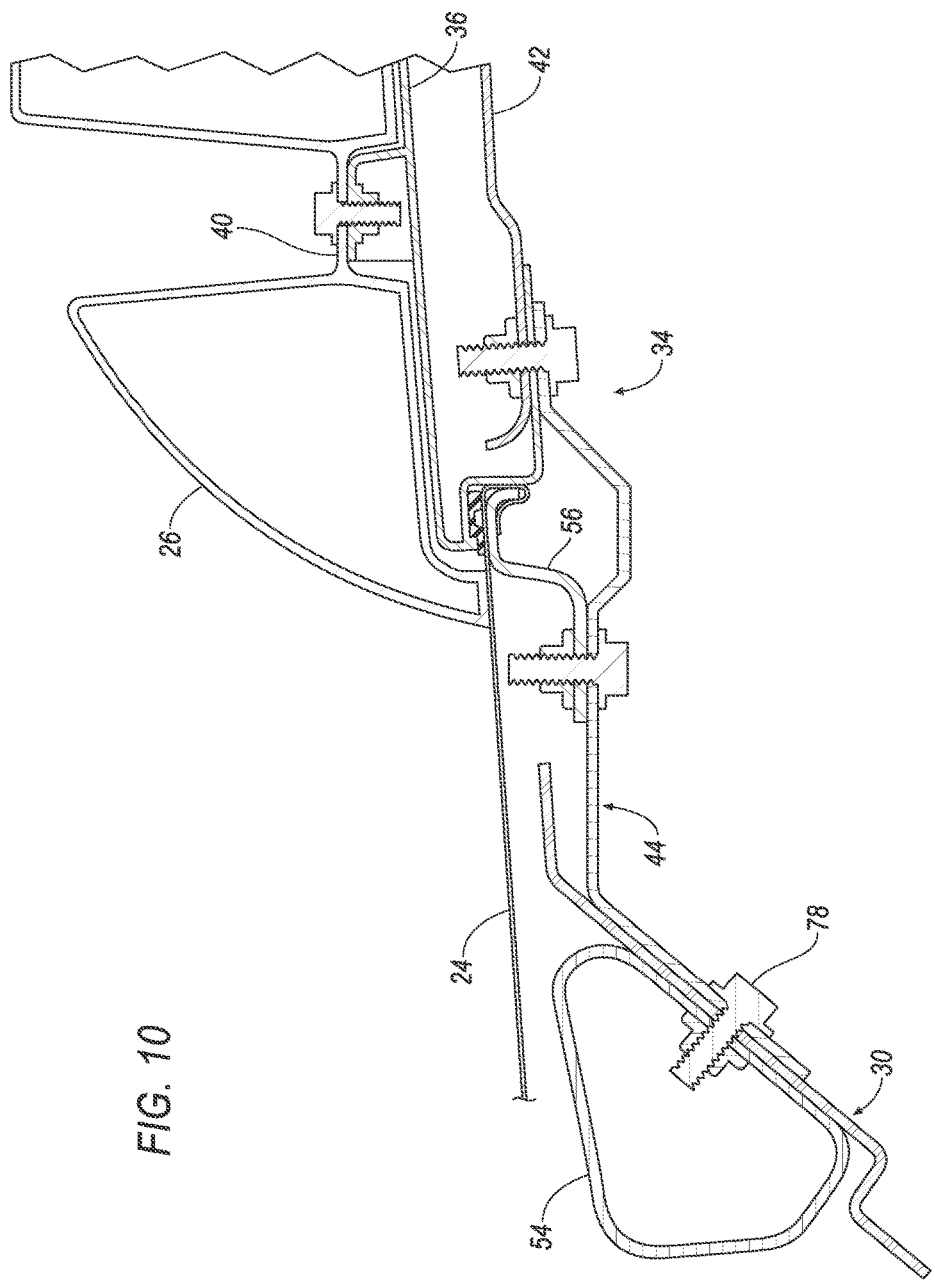
FIG. 10 is the section view of FIG. 9 with the sensor assembly installed.
Figure 11:
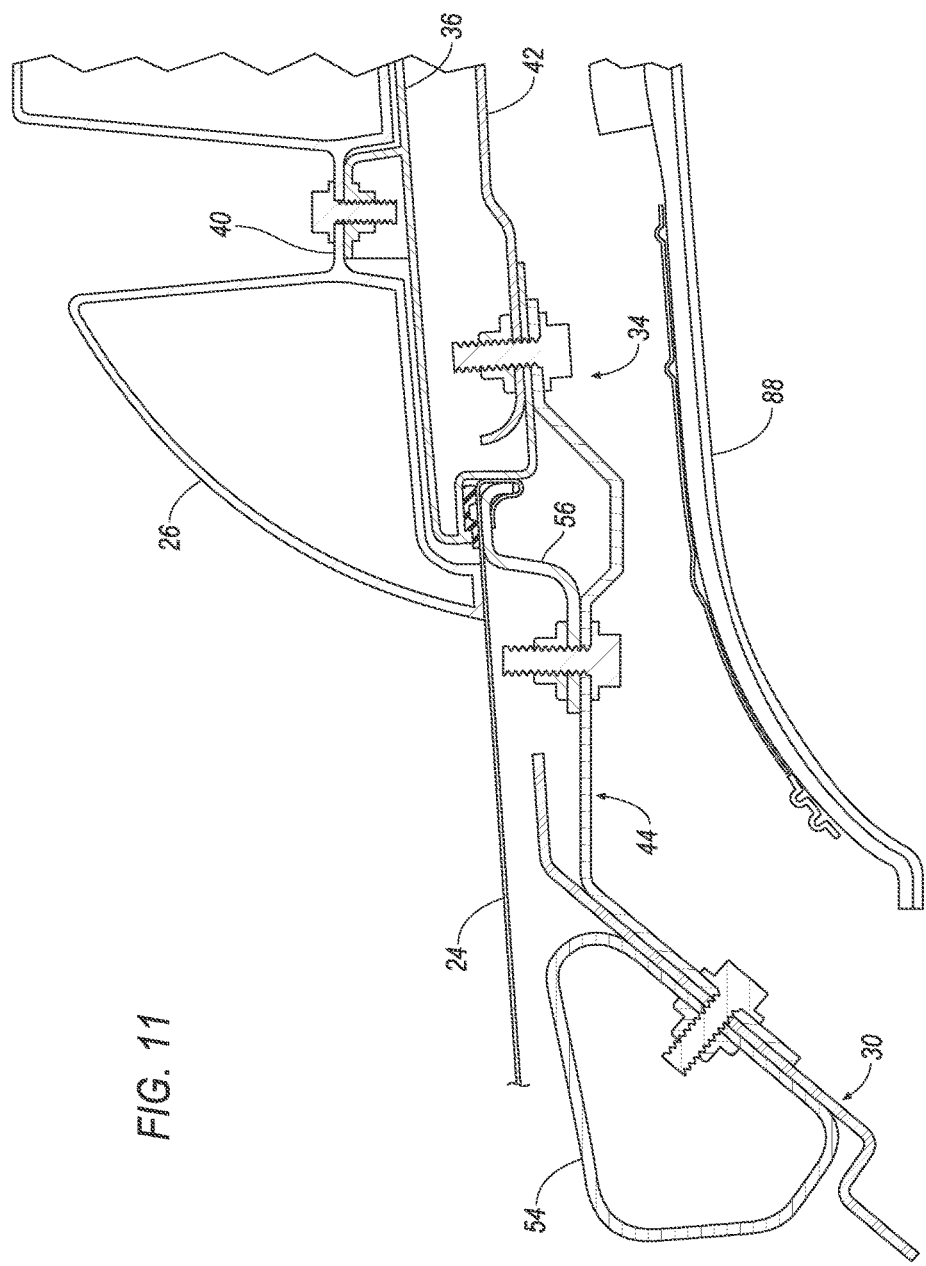
FIG. 11 is the section view of FIG. 10 with a headliner installed.

FIG. 6 shows body-in-white structure 30 without a roof panel 24 for the purpose of more clearly illustrating the support structure comprising part of mount 34. Support bows 42 are seen to extend between a left hand support bracket 44 and a right hand support bracket 46. Left hand support bracket 44 and right hand support bracket 46 are substantially mirror images of each other. Left hand support bracket 44 is shown in more detail in FIG. 7. Bracket 44 has a roof rail engaging portion 48, a cap support portion 50, and an intermediate portion 52 disposed between and connecting the roof rail engaging portion 48 and cap support portion 50. Exemplary bracket 44 includes a plurality of apertures for receiving fasteners for connecting rail engaging portion 48 to a vehicle structural element, e.g. a roof rail 54, connecting intermediate portion 52 to a reinforcement ring 56 to support the roof panel near a perimeter of opening 32, and connecting cap support portion 50 to the cap 36 and the support bow 42. This arrangement is illustrated in FIGS. 9 through 11.

Figure 8:
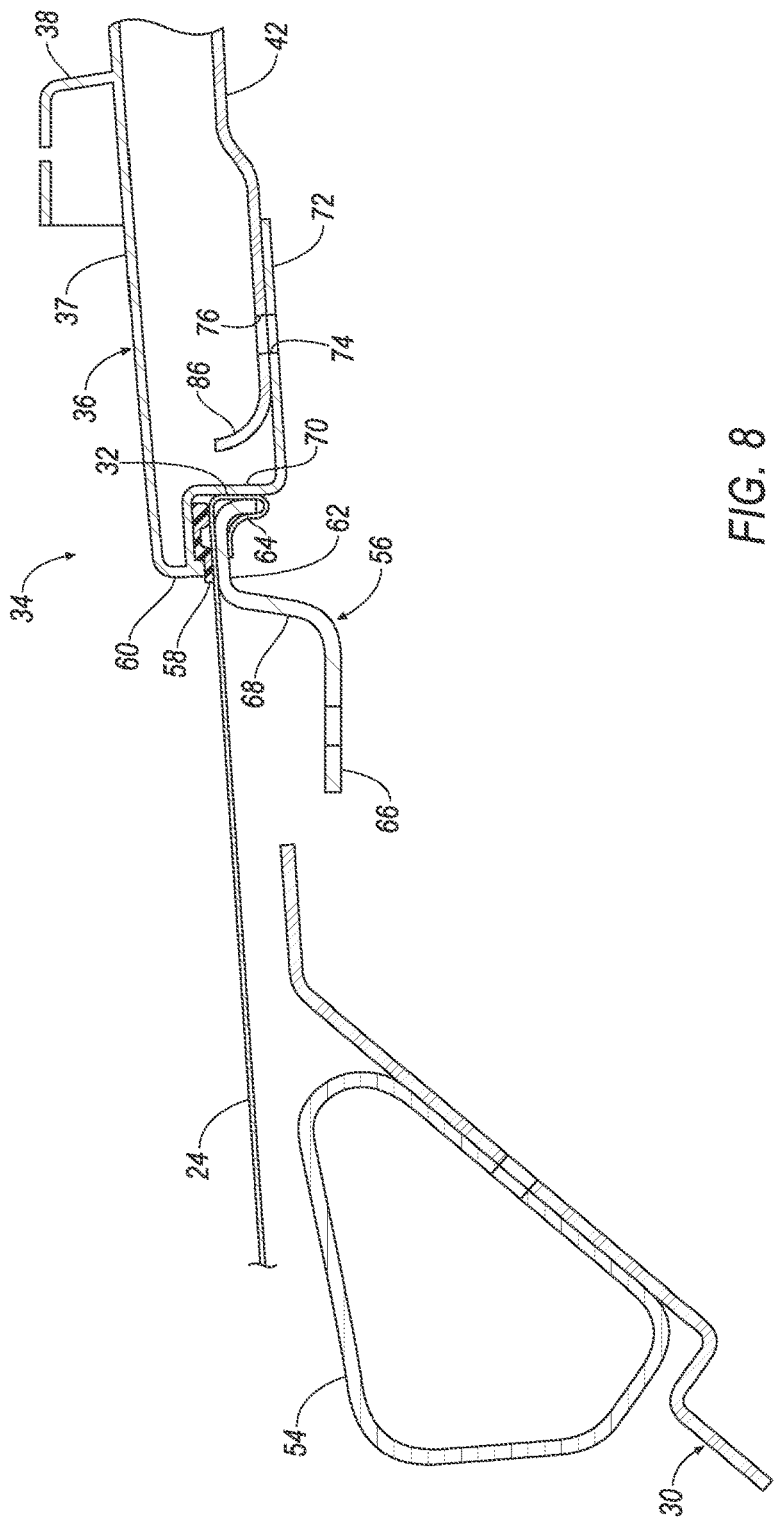
FIG. 8 is a section view of the body structure and the mounting cap in a first installed condition in the direction of arrows 8.

FIG. 8 shows mount 34 in a first installed condition with cap 36 disposed in opening 32. Roof panel 24 is engaged by a seal 58 disposed between panel 24 and a cap lip 60 of cap 36. Lip 60 overlaps opening 32. Seal 58 may have one or more circumferential grooves or beads. Such grooves or beads may aid in resisting leakage of air and water past seal 58. A support flange 62 of ring 56 engages a lower side of roof panel 24. Flange 62 has a downwardly directed flange edge 64 enveloped by a portion of roof panel 24. The portion of panel 24 wrapping around flange edge 64 defines opening 32 and provides opening 32 with a smooth surface for removable receipt of cap 36. Ring 56 is retained against panel 24 by the enveloping portion of panel 24. Ring 56 also includes a mounting flange 66 of ring which is used as described below to provide additional support of ring 56. A connecting wall 68 of ring 56 is disposed between and connects flange 62 and flange 66.

Cap 36 includes a positioning wall 70 extending downwardly from lip 60. Wall 70 is received by opening 32 and wall 70 positions cap 36 relative to roof panel 24. Positioning wall 70 has a perimeter slightly smaller than that of opening 32 to facilitate installation and removal of cap 36. A lower flange 72 of cap 36 extends from a lower edge of wall 70 in a direction away from opening 32 and substantially parallel to the upper surface 37 of cap 36. Bow 42 is shown as being supported by lower flange 72. Bow 42 may have an upturned flange 86. Such a flange 86 may aid bow 42 in transferring load from the body-in-white structure across opening 32 in the event of a lateral impact event. Flange 72 and bow 42 may have apertures, 74 and 76 respectively, for receiving connecting fasteners.

Figure 9:
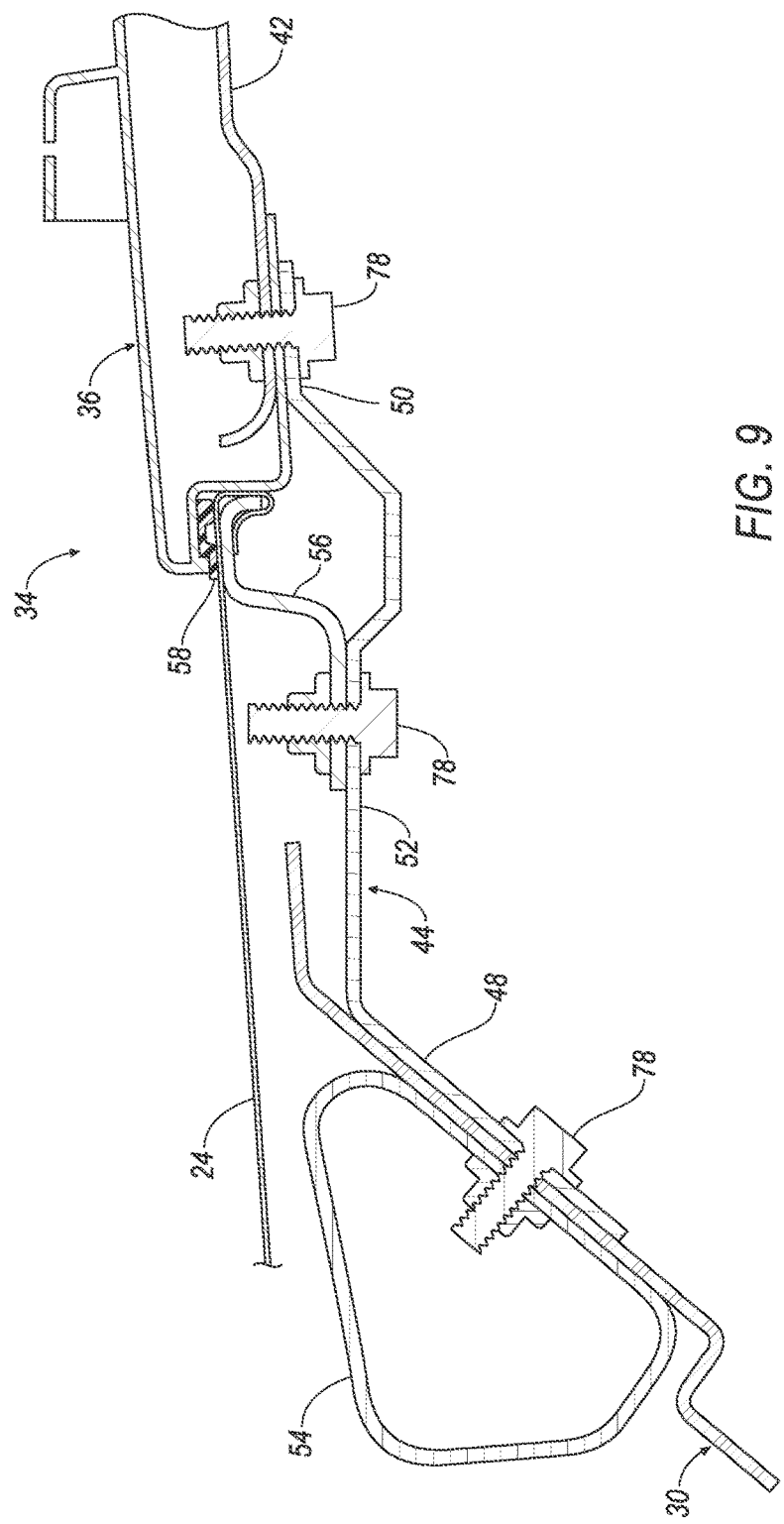
FIG. 9 is the section view of FIG. 8 with the mounting cap in a second installed condition.

FIG. 9 illustrates mount 34 in a second installed condition with left hand support bracket 44 installed. In its installed condition, bracket 44 supports a left side of ring 56. Front and rear edges of ring 56 may be supported by lateral roof beams (not shown) comprising part of the body-in-white structure 30. The installed condition of right hand support bracket 46 is substantially identical. Bracket 44 is illustrated as being connected in an exemplary manner to each of roof rail 54, ring 56, cap 36, and bow 42 by threaded fasteners 78 which in the illustrated example includes a bolt and a nut. It is appreciated that substitute connecting means may include, by way of example, sheet metal screws, welds, rivets, adhesives and combinations of such fasteners. Threaded fasteners may have the relative locations of nuts and bolts reversed from the positions illustrated if so facilitated by the ability to access the fasteners with tools. Fastening features may be provided by weld nuts or by forming threaded apertures. The precise nature of the fasteners is not critical to the present description of mount 34.

FIG. 10 shows housing 26 mounted to cap 36 over roof panel 24. A threaded feature is illustrated as being formed as part of attachment feature 38. Alternatively a nut may be retained in feature 38 by a clip (not shown). A bolt is illustrated as passing through an aperture at the bottom of feature 40 in housing 26 to clamp housing 26 to cap 36. The important characteristic of features 38 and 40 is that they cooperatively allow the secure mounting of sensor assembly 22 to cap 36. Such mounting requires alignment of features 38 and 40. Precisely how the housing 26 is fixed to the cap 36 is a matter of design choice.

FIG. 11 illustrates a headliner 88 in an installed location below mount 34 which conceals mount 34 from being seen by vehicle occupants.

Processing

In the course of manufacturing, a reinforcement ring 56 and a roof panel 24 are each formed. Roof panel 24 is formed with an opening 32. Ring 56 is aligned with the opening and panel is formed around ring 56 to envelope support flange 62, thereby defining opening 32. The assembled roof panel 24 and ring 56 are fixed to the body-in-white structure 30 consistent with the illustration of FIG. 8.

Cap 36 may be molded of a polymeric material. The polymeric material may be reinforce with strengthening fibers as described above. Cap 36 is provided with an aperture located at a predetermined location. One exemplary location is a center of the upper surface 37. Cap 36 is fitted with a sealing plug which may be formed of rubber or other suitable material. Seal 58 is fixed to a lower side of lip 60.

Cap 36 is positioned over opening 32 and wall 70 is passed into opening 32. Seal 58 engages an upper surface of roof panel 24. Brackets 44 and 46 are installed, fixing brackets 46 to the body-in-white structure 30. Bows 42 are placed inside cap 36. Brackets 44 and 46 are also attached to and provide additional support for cap 36 and ring 56. The vehicle body may be sprayed with water during assembly. Plug 80 prevents water intrusion during such events. With the completion of such water events, plug 80 is removed and sensor assembly 22 is positioned over cap 36. Attachment features 40 of the assembly's housing 26 are aligned with the attachment features 38 of cap 36 and sensor assembly 22 is secured to cap 36 and roof panel 24. Headliner 88 is then installed to conceal mount 34 from view of vehicle occupants.

CONCLUSION

An exemplary mount 34 for securing a sensor assembly 22 to a vehicle roof panel 24 and a method for installing the same have been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In the drawings, the same reference numbers indicate the same elements. Further, some or all of these elements may be changed. With regard to the processes, systems, methods, etc. described herein, it should be understood that, although the steps of such processes, etc. relating to roof-top mounting of sensor assemblies have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A mount for a roof-mounted vehicle sensor assembly, the mount compatible in shape with a moonroof opening in a vehicle roof panel, the mount comprising:
   a cap sized to overlap the moonroof opening;
   the cap having a plurality of attachment features to connect to the sensor assembly;
   a seal for disposition between the cap and the roof panel; and
   a plurality of support members for connecting the cap to roof rails.

2. The mount of claim 1, wherein the cap includes a cable passage aperture therethrough and further includes a removable sealing plug disposed in the aperture.

3. The mount of claim 1, wherein the cap is formed of a substantially rigid polymer.

4. The mount of claim 1, wherein at least one of the support members include a support bow extending across the cap.

5. The mount of claim 4, wherein the support bow is a discrete element relative to the cap.

6. The mount of claim 5, wherein the support bow is formed of metal.

7. The mount of claim 1, wherein at least one of the support members include a first bracket disposed between the cap and a one of the roof rails.

8. The mount of claim 1, wherein the support members include:
   a first bracket disposed between the cap and a first roof rail of the roof rails; and
   a second bracket disposed between the cap and a second roof rail of the roof rails.

9. The mount of claim 8, wherein the support members further include a support bow connecting the brackets.

10. The mount of claim 9, wherein the cap is formed of a substantially rigid polymer and the bow and the brackets are formed of metal.

11. The mount of claim 10, wherein the cap includes a cable passage aperture therethrough and further includes a removable sealing plug disposed in the aperture.

12. The mount of claim 10, further comprising a roof support ring disposed between the brackets and an inner surface of the roof panel.

13. A vehicle having a mount for a roof-mounted vehicle sensor assembly, the mount compatible in shape with a moonroof opening in a roof panel of the vehicle, the vehicle comprising:
   a cap sized to overlap the moonroof opening;
   the cap having a plurality of attachment features to connect to the sensor assembly;
   a seal for disposition between the cap and the roof panel; and
   a plurality of support members for connecting the cap to roof rails.

14. The vehicle of claim 13, wherein the cap includes a cable passage aperture therethrough and further includes a removable sealing plug disposed in the aperture.

15. The vehicle of claim 13, wherein at least one of the support members include a support bow extending across the cap.

16. The vehicle of claim 13, wherein the support members include:
   a first bracket disposed between the cap and a first roof rail of the roof rails; and
   a second bracket disposed between the cap and a second roof rail of the roof rails.

17. The vehicle of claim 16, further comprising a roof support ring disposed between the brackets and an inner surface of the roof panel, and wherein:
   the support members further include a support bow connecting the brackets;
   the cap is formed of a substantially rigid polymer and the bow and the brackets are formed of metal; and
   the cap includes a cable passage aperture therethrough.

* * * * *